United States Patent Office 3,091,638
Patented May 28, 1963

---

3,091,638
N,N'-DISUBSTITUTED HYDRAZINE DERIVATIVES
Hugo Gutmann, Birsfelden, Otto Straub, Bottmingen, and Paul Zeller, Neuallschwil, Switzerland, assignors to Hoffmann-La Roche Inc., Nutley, N.J., a corporation of New Jersey
No Drawing. Filed June 30, 1958, Ser. No. 745,276
Claims priority, application Switzerland July 3, 1957
12 Claims. (Cl. 260—557)

This invention relates to novel substituted acid hydrazides of the general formula $$R_1\text{—CO—NH—NH—}R_2 \qquad I$$

wherein $R_1$ represents a member selected from the group consisting of secondary alkyl radicals, tertiary alkyl radicals, lower cycloalkyl radicals having not more than 6 carbon atoms and lower 1-(lower alkyl)-cycloalkyl radicals having not more than 6 carbon atoms in the nucleus, and $R_2$ represents a member selected from the group consisting of lower alkyl and phenyl lower alkyl,
and to the salts thereof.

In the above Formula I, $R_1$ may be a secondary alkyl radical, e.g. iso-propyl and the like; a tertiary alkyl radical, e.g. tert.-butyl, tert.-pentyl, 3-methyl-3-pentyl, 3-ethyl-3-pentyl and the like; a lower cycloalkyl radical having not more than 6 carbon atoms, e.g. cyclopropyl, cyclobutyl, cyclopentyl and cyclohexyl; or a lower 1-(lower alkyl)-cycloalkyl radical, e.g. 1-methyl-1-cyclopropyl, 1-methyl-1-cyclobutyl, 1 - methyl - 1 - cyclopentyl, 1-methyl-1-cyclohexyl and the like. $R_2$ in Formula I represents a straight chain and branched chain lower alkyl group such as methyl, ethyl, propyl, isopropyl, butyl, sec.-butyl, isobutyl, amyl, hexyl, heptyl and the like or such groups with a phenyl radical attached.

The compounds of Formula I may be synthesized by several methods. The preferred method, which constitutes a particular feature of this invention, comprises condensing an acid of the general formula $$R_1\text{—COOH} \qquad II$$

with a substituted hydrazine of the general formula $$H_2N\text{—NH—}R_2 \qquad III$$

$R_1$ and $R_2$ in Formulae II and III having the same meaning as in Formula I,
in the presence of an N,N'-disubstituted carbodiimide and, if desired, converting the condensation product into a salt.

According to this process, an acid of Formula II or its salts, e.g. the alkali metal salts, are condensed with a substituted hydrazine of Formula III in the presence of a carbodiimide, without preliminary conversion of this acid or its salts into more reactive compounds, such as the esters, halides, anhydrides, amides, and the like. The N,N'-disubstituted carbodiimides used as condensing agents may be obtained, e.g. by treating disubstituted urea derivatives with p-toluene-sulfonylchloride in pyridine. The corresponding urea derivatives are recovered after the condensation. If suitably substituted carbodiimides are used, e.g. N,N'-dicyclohexylcarbodiimide, urea derivatives are obtained as by-products which may easily be separated from the reaction product. The reaction may e.g. be carried out at a temperature between 0 and 50°, preferably at room temperature or at a temperature slightly above room temperature. Advantageously, a solvent is used for the reaction. Solvents which may be used for this purpose include organic solvents, e.g. methylene chloride, chloroform, dioxane, tetrahydrofuran, dimethylformamide or acetonitrile, as well as water.

The compounds of this invention may also be produced by condensing a reactive functional derivative of an acid of the above Formula II, such as e.g. an ester, halide, anhydride or amide thereof, with a substituted hydrazine of the above Formula III. The condensation is preferably effected by heating together the reaction components.

A further method for the preparation of the novel substituted acid hydrazides consists in heating a salt formed from an acid of the above Formula II and a substituted hydrazine of the above Formula III.

Still another method of preparing the products of the invention consists in reacting the hydrazide of an acid of the above Formula II with a carbonyl compound and reducing simultaneously or subsequently the resulting hydrazone of the carbonyl compound. The reduction may be carried out by catalytic hydrogenation in an inert solvent and in the presence of catalysts, such as platinum, palladium-on-charcoal, and the like, or by reaction with lithium aluminium hydride. A modification of this method consists in treating the hydrazone formed with a Grignard compound, preferably methyl- or ethyl-magnesium halide, and hydrolyzing the product thus formed. Carbonyl compounds which may be used in this method include, e.g. acetone, methyl ethyl ketone and benzaldehyde.

According to this invention, the following compounds may e.g. be obtained:
1-trimethylacetyl-2-benzyl-hydrazine, 1 - trimethylacetyl-2-iso-propyl-hydrazine, 1-trimethylacetyl-2-tert.-butyl-hydrazine, 1-trimethylacetyl-2-phenylethylhydrazine, 1-trimethylacetyl-2-iso-butyl-hydrazine, 1-trimethylacetyl-2-sec.-butyl-hydrazine, 1 - (dimethyl-ethyl-acetyl)-2-iso-propyl-hydrazine, 1 - (dimethyl-ethyl-acetyl)-2-benzyl-hydrazine, 1-(methyl-diethyl-acetyl)-2-benzyl-hydrazine, 1-triethylacetyl-2-iso-propyl-hydrazine, 1 - [(1-methyl-1-cyclobutyl)-carbonyl]-2-iso-propyl-hydrazine, 1 - [(1-methyl-1-cyclobutyl)-carbonyl]-2-iso-butyl-hydrazine, 1 - [(1-methyl-1-cyclopropyl)-carbonyl]-2-iso-propyl-hydrazine, 1-[1-methyl-1-cyclopropyl)-carbonyl]-phenylethyl - hydrazine, 1-[(1-methyl-1-cyclohexyl)-carbonyl]-2-benzyl-hydrazine, 1-[(1-methyl-1-cyclohexyl)-carbonyl]-2-iso-propyl-hydrazine, 1-iso-butyryl-2-iso-propyl-hydrazine, 1-iso-butyryl-2-benzyl-hydrazine, 1-iso-butyryl-2-ethyl-hydrazine, 1-cyclopropylcarbonyl-2-iso-propyl-hydrazine, 1-cyclopropyl-carbonyl - 2 - benzyl-hydrazine, 1-cyclopropylcarbonyl-2-sec.-butyl-hydrazine, 1-cyclobutylcarbonyl-2-iso-propyl-hydrazine, 1-cyclobutylcarbonyl - 2 - benzyl-hydrazine, 1-cyclohexylcarbonyl - 2 - iso-propyl-hydrazine, 1-cyclohexylcarbonyl-2-tert.-butyl - hydrazine, 1 - cyclohexylcarbonyl-2-n-propyl-hydrazine and 1 - cyclohexylcarbonyl-2-benzyl-hydrazine.

A preferred group of compounds of the formula $R_1$—CO—NH—NH—$R_2$ includes those substituted acid hydrazides wherein $R_1$ is the tert.-butyl, cyclobutyl or cyclohexyl radical and $R_2$ is the iso-propyl or benzyl radical.

The substituted acid hydrazides obtained according to the processes of this invention form well-defined salts with inorganic acids, for example with hydrohalic acids, such as hydrochloric acid, hydrobromic acid and hydroiodic acid; with other mineral acids, such as sulphuric acid, phosphoric acid and nitric acid; as well as with organic acids, such as tartaric acid, citric acid, camphorsulphonic acid, ethanesulphonic acid, salicyclic acid, ascorbic acid, maleic acid, mandelic acid, and the like. Preferred salts are the hydrohalides, especially the hydrochlorides. The acid addition salts are conveniently prepared by reacting the substituted acid hydrazide with an excess of the appropriate acid, preferably in an inert solvent.

The compounds of this invention are monoamine oxidase inhibitors, that is, they inhibit the activity of monoamine oxidase which effects the deactivation of physiological regulators such as serotonin, tryptamine, epinephrine, etc., and stimulate the central nervous system. They are useful in psychotherapy for relief of disturbed or depressed states. They are also useful for increasing weight in cases where cachexia is present. The free hydrazine compound or a medicinally acceptable acid addition salt thereof may be administered orally or parenterally in conventional solid or liquid dosage forms such as tablets, capsules, injectables, etc., comprising therapeutic doses incorporated in a conventional solid or liquid vehicle with or without excipients.

In the following examples, all temperatures are indicated in degrees centigrade.

EXAMPLE 1

*1-Trimethylacetyl-2-Benzyl-Hydrazine*

10.2 g. of trimethylacetic acid, 10.1 g. of triethylamine and 15.8 g. of benzylhydrazine monohydrochloride were stirred for 1 hour at room temperature in 300 ml. of acetonitrile. After addition of 20.6 g. of N,N'-dicyclohexyl carbodiimide the mixture was stirred for about a further 3 hours, while the temperature of the reaction mixture was not allowed to rise over 30°. The precipitated dicyclohexyl urea was filtered off, the solvent was evaporated in vacuo and the residue was taken up in ether. The ethereal solution was first shaken with sodium bicarbonate solution. Then the solution was extracted several times with 3 N hydrochloric acid. The pH of the combined extracts was adjusted to 7–8 by the addition of caustic soda solution. After extraction with ether and evaporation of the solvent there was obtained 1-trimethylacetyl-2-benzyl-hydrazine of M.P. 68–69°.

*1-Cyclopropylcarbonyl-2-Iso-Propyl-Hydrazine*

By reacting in a similar manner 8.6 g. of cyclopropane carboxylic acid, 10.1 g. of triethylamine, 11.05 g. of iso-propylhydrazine monohydrochloride and 20.6 g. of N,N'-dicyclohexyl carbodiimide in 150 ml. of acetonitrile there was obtained 1-cyclopropylcarbonyl-2-iso-propyl-hydrazine which crystallised from ethyl acetate in the form of colourless platelets of M.P. 123–126°.

*1-Cyclohexylcarbonyl-2-Iso-Propyl-Hydrazine*

By reacting in a similar manner 12.8 g. of cyclohexane carboxylic acid, 10.1 g. of triethylamine and 11.05 g. of iso-propylhydrazine monohydrochloride in 150 ml. of acetonitrile and using 20.6 g. of N,N'-dicyclohexyl carbodiimide there was obtained 1-cyclohexylcarbonyl-2-iso-propyl-hydrazine which was recrystallised from ethyl acetate and petroleum ether, M.P. 122–123°.

*1-Cyclopropylcarbonyl-2-Sec.-Butyl-Hydrazine*

By reacting in a similar manner 8.6 g. of cyclopropane carboxylic acid, 8.8 g. of sec.-butylhydrazine and 20.6 g. of N,N'-dicyclohexyl carbodiimide there was obtained crude 1-cyclopropylcarbonyl-2-sec.-butyl-hydrazine which was purified by recrystallisation from ethyl acetate to obtain colourless prisms of M.P. 92–93°.

*1-Cyclobutylcarbonyl-2-Benzyl-Hydrazine*

By reacting in a similar manner 5.0 g. of cyclobutane carboxylic acid, 5.05 g. of triethylamine, 7.9 g. of benzylhydrazine monohydrochloride and 10.3 g. of N,N'-dicyclohexyl carbodiimide in 150 ml. of acetonitrile there was obtained the 1-cyclobutylcarbonyl-2-benzyl-hydrazine which, after recrystallisation from benzene and water, melted at 95–97°.

EXAMPLE 2

*1-Trimethylacetyl-2-Iso-Propyl-Hydrazine*

46.8 g. of ethyl trimethylacetate and 23.5 g. of hydrazine hydrate were heated for 24 hours at 140°. The reaction mixture was then distilled. The fraction boiling at 80–85°/2 mm. Hg solidified on cooling (M.P. 67–68°) and consisted of trimethylacetic acid hydrazide. 5 g. of this hydrazide were refluxed for 1 hour with 25 ml. of acetone. The excess acetone was then distilled off, and the residue was recrystallised from acetone-petroleum ether to obtain 1-trimethylacetyl-2-iso-propylidene-hydrazine of M.P. 71–72°. A solution of 0.1 mole of this hydrazone in 100 ml. of ethanol was added to a suspension of 0.2 g. of platinum oxide in 30 ml. of ethanol and hydrogenated at atmospheric pressure and room temperature until the hydrogen absorption (total 2.5 liters) ceased. The filtered hydrogenation solution was concentrated and the resulting residue recrystallised from high-boiling petroleum ether to obtain 1-trimethylacetyl-2-iso-propyl-hydrazine in the form of colourless prisms of M.P. 83–84°.

EXAMPLE 3

*1-Trimethylacetyl-2-Benzyl-Hydrazine*

180 g. of trimethylacetic acid hydrazide, M.P. 67–68°, were dissolved in 200 ml. of alcohol. After addition of 160 g. of benzaldehyde the mixture was heated on the steam bath for 1 hour. On cooling to −10° 150 g. of 1-trimethylacetyl-2-benzylidene-hydrazine of M.P. 155–157° precipitated. By concentrating the mother liquor a further crop of 135 g. of this product was obtained. The obtained hydrazone was suspended in 5000 ml. of absolute ether. To the suspension were added within ½ hour, while cooling with ice water, 1150 ml. of 4.2% ethereal lithium aluminum hydride solution, the reaction mixture was stirred for two hours and then allowed to stand overnight at room temperature. Then there were added dropwise, while stirring and cooling with ice water, first 300 ml. of ethyl acetate and then 140 ml. of water. The reaction mixture was refluxed for ½ hour and then filtered. The filter cake was extracted twice with boiling ether. After evaporation of the combined ethereal solutions the residue was recrystallised from low-boiling petroleum ether. The resulting 1-trimethylacetyl-2-benzyl-hydrazine melted at 68–69°.

EXAMPLE 4

*1-Trimethylacetyl-2-Benzyl-Hydrazine*

10 g. of trimethylacetic acid hydrazide, M.P. 67–68°, were dissolved in 100 ml. of alcohol and to the resulting solution was added benzaldehyde in an amount equivalent to the trimethylacetic acid hydrazide. The solution was heated on the steam bath for ½ hour and then hydrogenated at atmospheric pressure and room temperature in the presence of platinum catalyst. By working up the hydrogenation solution in the usual manner there was obtained 1-trimethylacetyl-2-benzyl-hydrazine which, after recrystallisation from low-boiling petroleum ether, was obtained in the form colourless prisms of M.P. 68–69°.

EXAMPLE 5

*1-Cyclobutylcarbonyl-2-Benzyl-Hydrazine*

22.8 g. of cyclobutane-carboxylic acid hydrazide were boiled for 3 hours with 21.2 g. of benzaldehyde in 100 ml. of absolute ethanol. The resulting solution was concentrated to dryness in vacuo, and the residue was recrystallised twice from high-boiling petroleum ether. 17 g. of the 1-cyclobutylcarbonyl-2-benzylidene-hydrazine thus obtained, M.P. 126–129°, were hydrogenated at atmospheric pressure and at room temperature in 300 ml. of ethanol in the presence of 0.2 g. of platinum oxide until the calculated amount of hydrogen had been absorbed. The catalyst was removed by filtration and the hydrogenation solution was concentrated to dryness in vacuo. The residue was recrystallised from benzene and from water to obtain 1-cyclobutylcarbonyl-2-benzyl-hydrazine of M.P. 95–97°.

EXAMPLE 6

*1-Cyclobutylcarbonyl-2-Iso-Propyl-Hydrazine*

56 g. of ethyl cyclobutane-carboxylate were refluxed for ½ hour with 36 g. of 80% hydrazine hydrate. On concentration of the solution in the vacuum of a water jet pump at 70° there were obtained 56 g. of crude cyclobutane-carboxlic acid hydrazide which were refluxed for 20 hours with 500 ml. of acetone. The excess acetone was evaporated in vacuo. Recrystallisation of the residue from ethyl acetate yielded 1-cyclobutylcarbonyl-2-iso-propylidene-hydrazine of M.P. 87–88°. 23 g. of this hydrazide were hydrogenated in alcohol by means of platinum oxide in the manner described in Example 5. The 1-cyclobutylcarbonyl-2-iso-propyl-hydrazine thus formed was recrystallised from ethyl acetate and melted at 116–118°.

EXAMPLE 7

1-Iso-Butyryl-2-Iso-Propyl-Hydrazine 28 g. of iso-butyric acid hydrazide were refluxed for 5 hours in 400 ml. of acetone. The reaction solution was concentrated to cause crystallisation of 33 g. of 1-iso-butyryl-2-iso-propylidene-hydrazine, M.P. 92–96°. This hydrazine was hydrogenated at atmospheric pressure and room temperature in 250 ml. of alcohol and in the presence of platinum catalyst until 1 equivalent of hydrogen had been absorbed. After removal of the catalyst the solution was concentrated and the crystalline residue was recrystallised from petroleum ether. The resulting 1-iso-butyryl-2-iso-propyl-hydrazine melted at 66–68°.

EXAMPLE 8

1-(2-Ethylcaproyl)-2-Iso-Propyl-Hydrazine 71 g. of ethyl 2-ethylcaproate and 27 g. of hydrazine hydrate were heated for 3 days at 120–125° in an autoclave. Thereafter the low-boiling constituents of the reaction mixture were removed in the vacuum of a water jet pump at 80°. The crystalline residue melted at 91–93° and consisted of 2-ethylcaproic acid hydrazide. This residue was refluxed for 1 hour with 8 times its quantity of acetone. The residue obtained by concentrating the reaction mixture was recrystallised from petroleum ether. There was thus obtained 1-(2-ethylcaproyl)-2-iso-propylidene-hydrazine of M.P. 84–85°. Hydrogenation of this compound in alcoholic solution by means of platinum catalyst in the manner described in the preceding examples yielded 1-(2-ethylcaproyl)-2-iso-propyl-hydrazine which crystallised from petroleum ether in the form of colourless needles of M.P. 89–90°.

We claim:
1. A compound of the group consisting of substituted acid hydrazides of the formula

R₁—CO—NH—NH—R₂ wherein R₁ represents a member selected from the group consisting of tertiary lower alkyl radicals, lower cycloalkyl radicals having not more than 6 carbon atoms and lower 1-(lower alkyl)-cycloalkyl radicals having not more than 6 carbon atoms in the nucleus, and R₂ represents a member selected from the group consisting of lower alkyl and phenyl lower alkyl, and medicinally acceptable acid addition salts thereof.

2. A compound corresponding to the formula

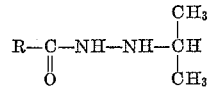

$$R-\underset{\underset{O}{\|}}{C}-NH-NH-\underset{\underset{CH_3}{|}}{\overset{\overset{CH_3}{|}}{C}}H$$

wherein R represents a member of the group consisting of cycloalkyl and methyl substituted cycloalkyl wherein the cycloalkyl group contains from 3 to 6 carbon atoms, inclusive.

3. A substituted acid hydrazide of the formula t.-lower alkyl-CO—NH—NH-lower alkyl 4. 1-cyclobutanecarbonyl-2-isopropylhydrazine.
5. 1-cyclohexanecarbonyl-2-isopropylhydrazine.
6. 1-cyclopentanecarbonyl-2-isopropylhydrazine.
7. 1-trimethylacetyl-2-iso-propyl-hydrazine.
8. 1-trimethylacetyl-2-tert.-butyl-hydrazine.
9. 1-trimethylacetyl-2-benzyl-hydrazine.
10. 1-cyclobutylcarbonyl-2-benzyl-hydrazine.
11. 1-cyclohexylcarbonyl-2-tert.-butyl-hydrazine.
12. 1-cyclohexylcarbonyl-2-benzyl-hydrazine.

References Cited in the file of this patent

UNITED STATES PATENTS 2,931,811 Hallmann _____ Apr. 5, 1960
2,992,269 Horrom et al. _____ July 11, 1961

OTHER REFERENCES

Wieland: Hydrazine, 1913, p. 180.
Beilstein: Handbuch der Organischen Chemie, vol. 2 (4th ed.), pp. 294, 316 (1920).
Beilstein: Vol. 15 (1932), pp. 247, 249, 250.
Sidgwick: Org. Chem. of Nitrogen, Oxford University Press (London) (1937), pages 378–399; pp. 398–399 relied on.
Muller et al.: Journ. für Prakt. Chemie, vol. 152, pp. 219–36, p. 229 relied on (1939).
Ralston: Fatty Acids and Their Derivatives, John Wiley & Sons, Inc. (New York) (1948), p. 309.
Degering: An Outline of Organic Nitrogen Compounds, University Lithoprinters (Ypsilanti) (1950), pp. 376, 378–379.
Yale et al.: Journ. Am. Chem. Soc., vol. 75, pp. 1933–1942 (p. 1933 in particular relied upon) (1953).
Sheehan et al.: Journal American Chem. Society, vol. 77, pp. 1067–1068 (1955).
Sheehan et al.: J. Org. Chem., vol. 21 (1956), pp. 439–41.
Reed: Hydrazine and Its Derivatives, W. Heffer and Sons, Ltd. (Cambridge) (1958), pp. 18–20.